United States Patent [19]
Tannhauser

[11] Patent Number: 6,130,895
[45] Date of Patent: Oct. 10, 2000

[54] METHODS AND DEVICES FOR SENDING AND RECEIVING DATA AND SYSTEMS USING THEM

[75] Inventor: Falk Tannhauser, Rennes, France

[73] Assignee: Canon Kabushiki Kaisha, Tokyo, Japan

[21] Appl. No.: 09/138,002

[22] Filed: Aug. 21, 1998

[30] Foreign Application Priority Data

Aug. 25, 1997 [FR] France ................................. 97 10612

[51] Int. Cl.[7] ........................................................ H04J 3/16
[52] U.S. Cl. ........................ 370/468; 370/473; 375/295; 375/316
[58] Field of Search .................................... 375/295, 316, 375/259; 370/437, 470, 468, 473, 515, 509; 714/776

[56] References Cited

U.S. PATENT DOCUMENTS

| | | | |
|---|---|---|---|
| 4,271,520 | 6/1981 | Coombes et al. | 371/42 |
| 4,312,070 | 1/1982 | Coombes et al. | 371/40 |
| 5,729,648 | 3/1998 | Boyce et al. | 386/68 |
| 5,953,389 | 9/1999 | Pruett et al. | 379/9 |

FOREIGN PATENT DOCUMENTS

| | | |
|---|---|---|
| 1448178 | 9/1976 | United Kingdom . |
| WO9619054 | 6/1996 | WIPO . |
| WO9731446 | 8/1997 | WIPO . |

*Primary Examiner*—Chi H. Pham
*Assistant Examiner*—Bayard Emmanuel
*Attorney, Agent, or Firm*—Fitzpatrick, Cella, Harper & Scinto

[57] ABSTRACT

A system for sending sequences of data to be transmitted includes inputting data sequences to be transmitted and repeating data sequences to be transmitted. Data sequences referred to as "key sequences" which provide a key sequence for each data sequence to be transmitted coming from the input or from the repetition are selected independently of the data and the data sequence to be transmitted. The key sequences are different for data sequences to be transmitted which are separated by at least a predetermined number of other data sequences to be transmitted. Each data sequence to be transmitted is combined with the key sequence corresponding thereto in order to provide a sequence of processed data. Finally, frames successively representing each processed data sequence are sent.

26 Claims, 4 Drawing Sheets

METHODS AND DEVICES FOR SENDING AND RECEIVING DATA AND SYSTEMS USING THEM

The present invention concerns methods and devices for sending and receiving data and systems using them. It applies in particular to local wireless networks, to information capture devices and to information output devices.

The present invention aims to avoid repetitive transmission errors caused by particular data sequences, when these sequences cause the loss of data packets and the retransmission of lost packets.

During any data transmission, and in particular in transmissions within a local wireless network, transmission errors can arise. Several ways of dealing with such errors are known to persons skilled in the art: it is possible:

to use an error correction code which makes it possible to correct a certain number of errors and to detect errors which cannot be corrected, or to use a code only for detecting errors.

In all cases, the data packets having errors which cannot be corrected are discriminated by the data link layer (the layer numbered 2 in the OSI model) and these packets are not presented to the higher-level layers. One of the tasks of the latter (in particular the transportation layer, numbered 4) is to detect the packet losses and to require a retransmission of these packets.

These retransmission mechanisms function well where the errors appear in a random fashion, independently of the transmitted data. In this case, the probability of error affecting a retransmission is very low and equal to the probability of error affecting the retransmission of any packet.

However, in the case of certain transmission channels, the transmission errors observed are often related to particular data sequences to be transmitted. In this case, when a data frame containing a sequence causing a transmission error is retransmitted after the loss of the first transmitted frame, the same transmission error will arise and cause a further retransmission. The data transmission then remains blocked at this frame.

This problem is therefore serious, even if it arises very rarely, since transmission is then blocked.

The document JP-02 186 734 (NIPPON DENKI KABUSHIKI KAISHA) is known, which proposes to process data frames by combining them (for example with an "exclusive OR" gate) with a so-called "key" frame, for example of sixteen binary data.

The device which is the object of this document presents numerous drawbacks:

the key sequence being fixed, some data frames to be transmitted cause, after combination, the appearance of sequences presenting difficulties (for example series of "0" or series of "1") when the transmission channel eliminates the low frequencies;

a procedure is then provided for, so that, when several transmissions of the same frame have failed, the key sequence is modified;

the latter procedure, which is complex to implement, necessitates cooperation between different layers of the above-mentioned OSI model, which is not possible when the hardware and software using these different layers have different origins: the retransmissions are in general organised by the transportation layer (numbered 4) and therefore dependent on the protocol used on the network;

when the sending device and receiving device become desynchronised, which can happen when one or more frames are lost, the counting of the number of retransmissions of a given frame gives different results in these devices and the change in the key sequence can be desynchronised and cause new transmission errors;

a frame acknowledgement procedure is then necessary, which further increases the cost of implementing the method of document JP-02 186 734.

The present invention sets out to remedy these drawbacks.

To this end, the present invention relates, according to a first aspect, to a device for sending data sequences to be transmitted, characterised in that it has:

an input for data sequences to be transmitted;

a means of repeating data sequences to be transmitted;

a means of selecting data sequences referred to as "key sequences" adapted to provide a key sequence for each data sequence to be transmitted coming from the said input or from the repetition means, independently of the data in the data sequence to be transmitted, the key sequences being different for data sequences to be transmitted which are separated by at least a predetermined number of other data sequences to be transmitted;

a data combination means adapted to combine each data sequence to be transmitted with the key sequence which corresponds to it, in order to provide a sequence of processed data; and a sending means adapted to send frames successively representing each sequence of processed data, so that two identical sequences of data to be transmitted, at least one of which comes from the repetition means, and separated by at least the said predetermined number of other data sequences to be transmitted, are associated with two different key sequences and with two different processed sequences.

By virtue of these provisions, no frame acknowledgement is necessary. In addition, it is not necessary to know that a retransmission is taking place in order to change key sequence, this being performed regularly.

The sending device according to the invention does not therefore have to manage the frame retransmissions, another device being able to take care of these.

The invention can thus be implemented with any transmission protocol, without the transportation layer having to be modified. The invention thus makes it possible to decouple the transmission protocol, which concerns layers 1 and 2 of the OSI model, from the higher layers of the protocol. The sending device according to the invention does not in particular have to take into account the headers of the data sequences to be transmitted.

The invention is therefore particularly simple to implement.

According to particular characteristics, the sending means is adapted to send frames which successively represent on the one hand each processed data sequence and on the other hand the key sequence used to form the said processed data sequence.

By virtue of these provisions, even when a frame is lost during transmission, the key sequence can be found by processing the last frame received.

According to particular characteristics, the means of selecting data sequences referred to as "key sequences" is adapted to provide different key sequences for successive data sequences to be transmitted, the said predetermined number being nil.

By virtue of these provisions, when two successive data sequences to be transmitted are identical, for example when they correspond to a transmission and then a retransmission of the same data sequence, the key sequence having changed, the processed sequence changes and the risk of finding, in each of the processed sequences, series of data causing a transmission error, is much lower than when the key remains unchanged.

According to particular characteristics, the data to be transmitted are binary data. By virtue of these provisions, the invention applies to the transmission of any digital data.

According to particular characteristics, the selection means uses a pseudo-random determination of key sequences. By virtue of these provisions, the risk that a retransmission of one and the same data sequence to be transmitted being combined several times with the same key sequence is very low, even when the said data sequence to be transmitted appears regularly.

According to particular characteristics, the combination means is adapted to combine the data to be transmitted and the data of the key sequences, successively combining each data item to be transmitted with a data item of a key sequence.

Preferentially, the sending device using data sequences to be transmitted and key sequences having binary data, the combination means implements an "exclusive OR" logic function which associates a value "0" with two identical binary values and a value "1" with two different binary values.

By virtue of each of these provisions, the invention is particularly simple, reliable and inexpensive to implement.

According to particular characteristics, the sending device as briefly disclosed above has a means of receiving a message representing a transmission error in a data sequence to be transmitted and the repetition means is adapted to repeat each data sequence to be transmitted corresponding to a message representing a transmission error.

According to a second aspect, the invention relates to a method of sending data sequences to be transmitted including:
  a step of inputting a data sequence to be transmitted;
  a step of repeating a data sequence to be transmitted, where a previous transmission has been affected by error, characterised in that it includes:
    a step of selecting key sequences of data during which a key sequence is supplied for each data sequence to be transmitted coming from the input step or from the repetition step, the said key sequences being different, for data sequences to be transmitted separated by at least a predetermined number of other data sequences to be transmitted;
    a data combination step during which each data sequence to be transmitted is combined with the key sequence which corresponds to it, and a sequence of processed data is supplied; and
    a sending step during which frames are sent successively representing each sequence of processed data, so that two identical data sequences to be transmitted, where at least one comes from the repetition step, and separated by at least the said predetermined number of other data sequences to be transmitted, are associated with two different key sequences and with two different processed sequences.

According to a third aspect, the invention relates to a device for receiving transmitted data, characterised in that it includes:
  a receiving means adapted to supply sequences of processed data;
  a means of selecting data sequences referred to as "key sequences" adapted to supply a key sequence for each sequence of processed data, the said key sequences being different, for sequences of processed data separated by at least a predetermined number of other sequences of processed data;
  a means of processing data adapted to combine each sequence of processed data with a key sequence which corresponds to it, in order to supply a sequence of transmitted data;
  a means of detecting erroneous sequences; and
  an output for transmitted data sequences.

According to a fourth aspect, the invention relates to a method of receiving transmitted data, characterised in that it includes:
  a receiving step, during which sequences of processed data are supplied;
  a step of selecting data sequences referred to as "key sequences", during which a key sequence is supplied for each processed data sequence, the said key sequences being different, for processed data sequences separated by at least a predetermined number of other processed data sequences;
  a data processing step, during which each processed data sequence is combined with the key sequence which corresponds to it, and supplies a sequence of transmitted data;
  an erroneous sequence detection step; and
  a step of outputting transmitted data sequences.

The invention also relates to a computer, an information capture device, a network interface system and a wireless sending device, characterised in that they include a sending device as briefly disclosed above.

The invention also relates to:
  an information capture device, characterised in that it has:
    a sensor adapted to supply data to be transmitted representing a physical quantity, and
    a sending device as briefly disclosed above;
  an information output device, characterised in that it has:
    a receiving device as briefly disclosed above, and
    a transducer adapted to modify a physical quantity in a manner representing transmitted data; and
  a network, characterised in that it has:
    at least one sending device as briefly disclosed above,
    at least one receiving device as briefly disclosed above,
    at least one transmission channel, the data sequences received by the receiving means of the receiving device including frames sent by the sending means of each sending device intended for the said receiving device, by means of at least one transmission channel.

Cameras, scanners, facsimile machines, modems, videotape recorders, video cameras, digital cameras, photocopiers, sound recording devices, telephones, keyboards, diskette readers, hard disks and more generally information media readers, constitute information capture devices according to the invention.

Computers, videotape recorders, facsimile machines, modems, printers, display screens, sound transmission systems, television receivers, telephones, diskette readers, hard disks and more generally information storage means, constitute information output devices according to the invention.

This sending method, this receiving device, this receiving method, these information capture devices and these information output devices offer the same advantages as the sending device as briefly disclosed above. These advantages are therefore not repeated here.

Other characteristics and advantages of the invention will emerge from the following description, given with reference to the accompanying drawings in which.

The embodiment described and depicted in FIGS. 1 to 4 uses binary data.

Figure 1:
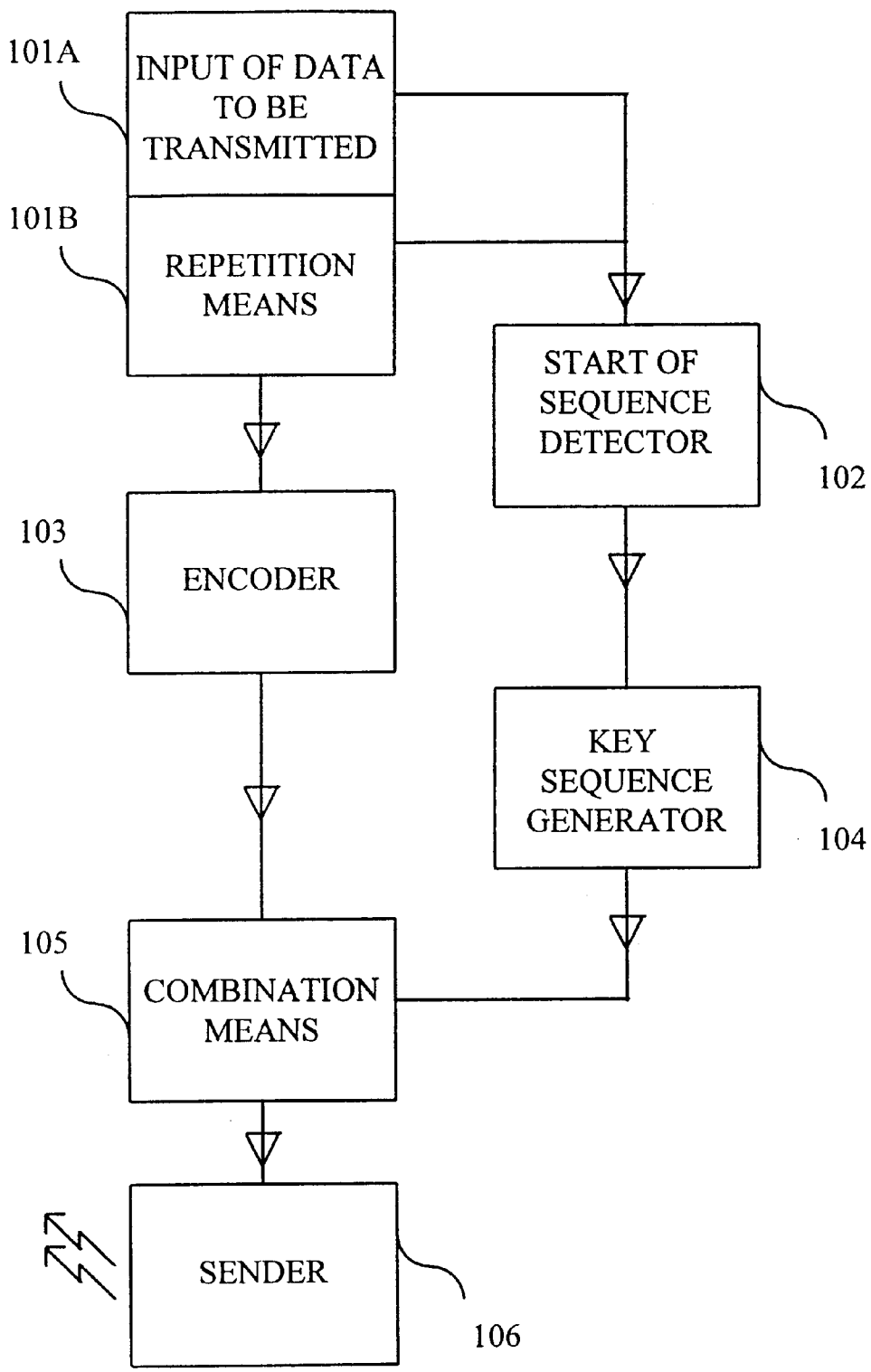
FIG. 1 depicts a block diagram of a sending device according to the present invention.

In FIG. 1, an input for data to be transmitted 101A can be seen. This input 101A is connected to a data source (not shown), which can include either a sensor supplying data representing physical quantities, or a storage means supplying data stored in memory, or a computer system carrying out data processing.

The input for data to be transmitted 101A is connected to a repetition means 101B adapted to repeat the data sequences to be transmitted, on reception, by means of a receiving means, not shown but incorporated in the sending device, of a message coming from a receiving device described below and corresponding to data sequences which, on reception, are affected by errors which are not able to be corrected. The repetition means has a memory for sequences to be transmitted and functions according to known technologies, for example in networks of the "Ethernet" type.

A start of sequence detector 102 detects data coming from the data input 101A and from the repetition means 101B which constitute a data sequence to be transmitted. The start of sequence detector can, for example, be a counter which counts a predetermined number of data or a comparison means which detects the appearance, in the data sequence to be transmitted, of a succession of particular data which marks the start of a data frame to be transmitted.

The start of sequence detector 102 transmits, to a key sequence generator 104, a signal representing the start of a data sequence to be transmitted. The key sequence generator 104, consisting for example of an arithmetic logic unit operating with a program designed for this purpose, supplies a sequence of sixteen random bits, according to techniques known in the field of pseudo-random number generation.

The data sequence to be transmitted is encoded by an encoder 103 which determines redundancies (see FIG. 2) which can make it possible to detect and/or to correct errors affecting the data sequence to be transmitted.

A combination means 105 combines the data to be transmitted and the redundant data related to them, on the one hand, with the key sequence supplies by the key sequence generator 104 and on the other hand in order to supply a sequence of processed data.

In the embodiment described and depicted, the combination means combines, with an "exclusive OR" logic function, commonly referred to as "XOR", a binary data item from the data sequence to be transmitted and redundant data, in order, with a binary data item of the key sequence, in order, starting from the start of this key sequence each time the end of this sequence has been reached.

It should be stated that the XOR logic function associates, with two identical binary data items ("0" or "1"), the binary data item 0 and, with two difference binary data items, the binary data item 1.

Thus, by way of example:

if the data sequence to be transmitted is the binary data sequence:
10011101001110100110101 if the redundant data form, using a known redundancy determination method known to persons skilled in the art, a binary data sequence such that:
1011001, and if the key sequence is the binary data sequence:
0010111010111001 then the processed sequence will be the "exclusive OR" logic functions applied to the binary data of the same ranking in the two series:
100111010011101001101011011001 and
001011101011100100101110101110, the first of these series consisting of the data sequence to be transmitted followed by the redundant data sequence and the second of these series being formed by an integer number (here 1) of times the key sequence and a complementary number of the first data items of the key sequence, a number which enables the second series to have as many binary data items as the first.

The processed sequence is then:
101100111000001101000101110111 the first data item of the processed sequence being the "exclusive OR" logic function applied to the binary data items "1" and "0", the second binary data item of the processed sequence being the "exclusive OR" function applied to the binary data items "0" and "0", . . .

To this end, the encoder 103 and the key sequence generator 104 are synchronised, by means of a clock (optionally followed by a frequency divider), so that each of them supplies a binary data item at regular intervals of time. However, it is found here that the data can also be matched after they have been read in memory, successively, notably when the combination means 105 consists of an arithmetic logic unit using software.

The combination means 105 also adds the key sequence to the processed sequence.

A sending means, here a transmitter 106, performs the remote sending of a signal, a characteristic physical quantity of which, such as the amplitude, frequency or phase, represents successive binary data items in:

a header related to the communication protocol; for example, in the case of the "Ethernet" protocol, the header preferably represents a destination address, a type of frame and the length of the Ethernet frame encapsulated in the transmitted data sequence and the check data, the key sequence; and the sequence of processed data.

The sender 106 is for example an amplitude modulation radio transmitter. However, within the meaning of the present invention, a sending means is any means adapted to make available the signal representing the data coming from the combination means 105, such as, for example, any interface with other means (not shown).

It should be noted here that, as a preliminary to the inputting of the data to be transmitted by the input 101A, these data may have been processed by means which are not shown. Likewise, means which are not shown may be interposed between the combination means and the sender 106 in order to effect complementary processings on the data sequences to be processed.

Figure 2:
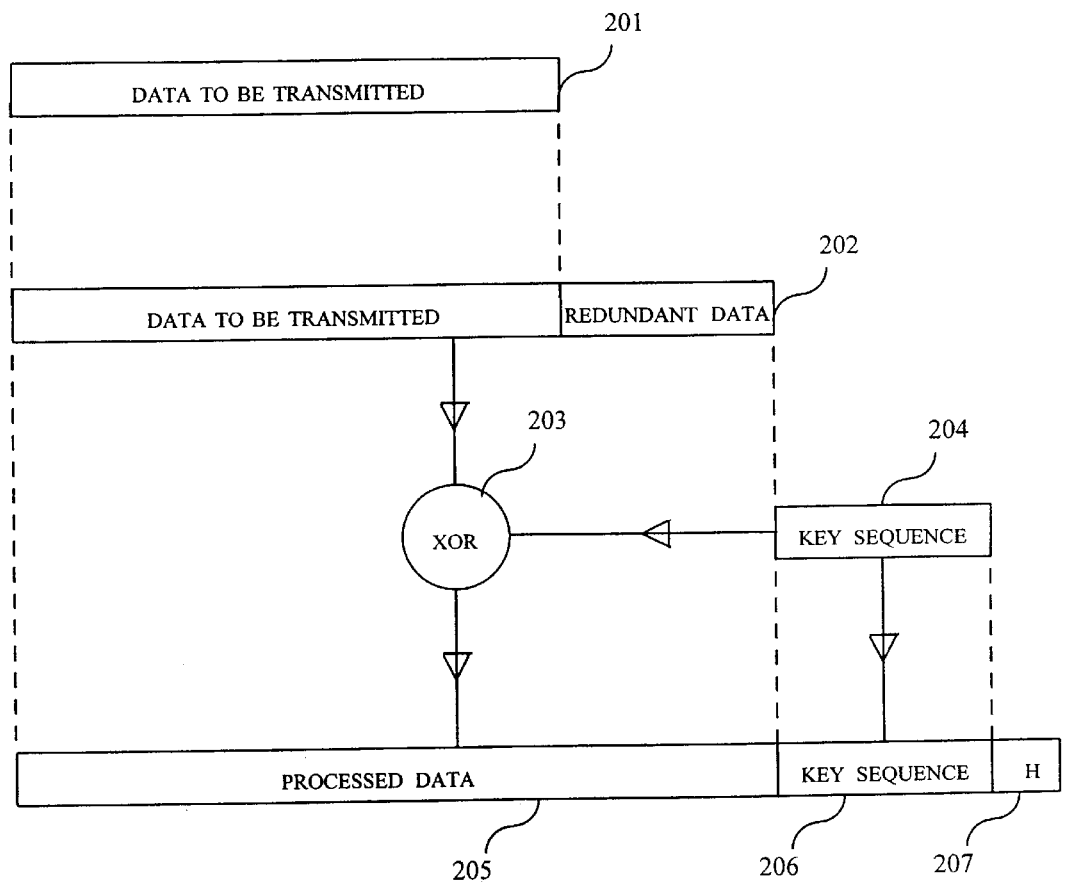
FIG. 2 depicts a succession of data sequences used in a sending device as illustrated in FIG. 1.

FIG. 2 shows a sequence of data to be transmitted 201 as it arrives at the data input 101 and passes through it intended on the one hand for the encoder 103 and on the other hand for the start of sequence detector 102.

Next there can be seen a coded data sequence 202, leaving the encoder 103 and including on the one hand redundant data, that is to say data able to allow or correct certain errors affecting the data to be transmitted and, on the other hand, the sequence of data to be transmitted.

A 16-bit key sequence is symbolised at 204, and arrows indicate that the coded data sequence and the key sequence join each other again at the input of the combination means, symbolised by a circle 203, which performs the binary data to binary data "exclusive OR" logic function, running through the key sequence as many times as necessary.

The processed data sequence 205 is associated with the key sequence 206 and a header 207 for forming a frame in accordance with the communication. protocol used, this frame being sent by the transmission means 106.

It will be understood that, for two identical sequences of data to be transmitted, one of which at least comes from the repetition means 101B, the key sequences are different and consequently the processed sequences are different. Thus a transmission channel sensitive to particular processed data series, and which may affect them with error, receives, for two identical sequences of data to be transmitted, two difference processed data sequences.

Figure 3:
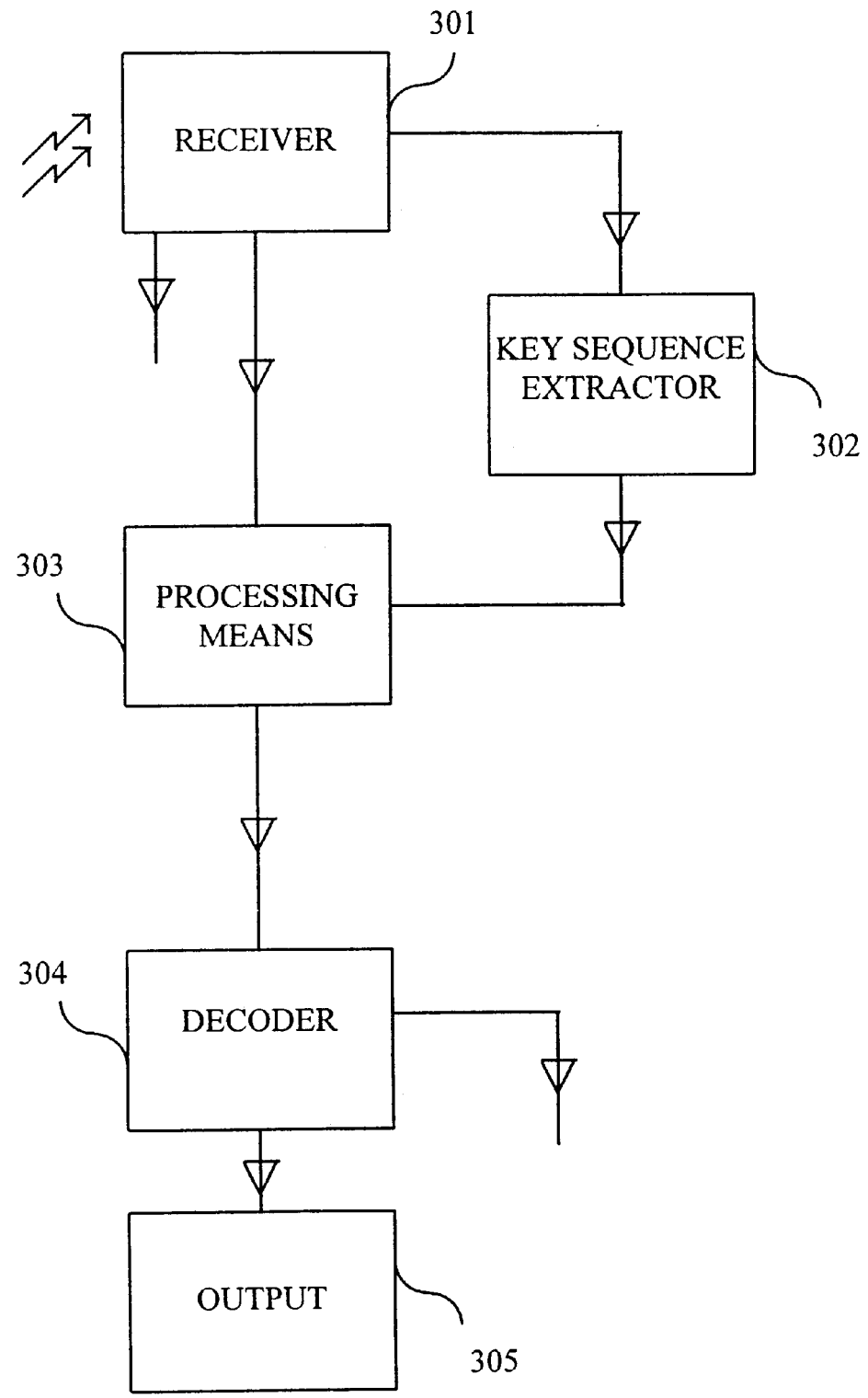
FIG. 3 depicts a block diagram of a receiving device according to the present invention.
Figure 4:
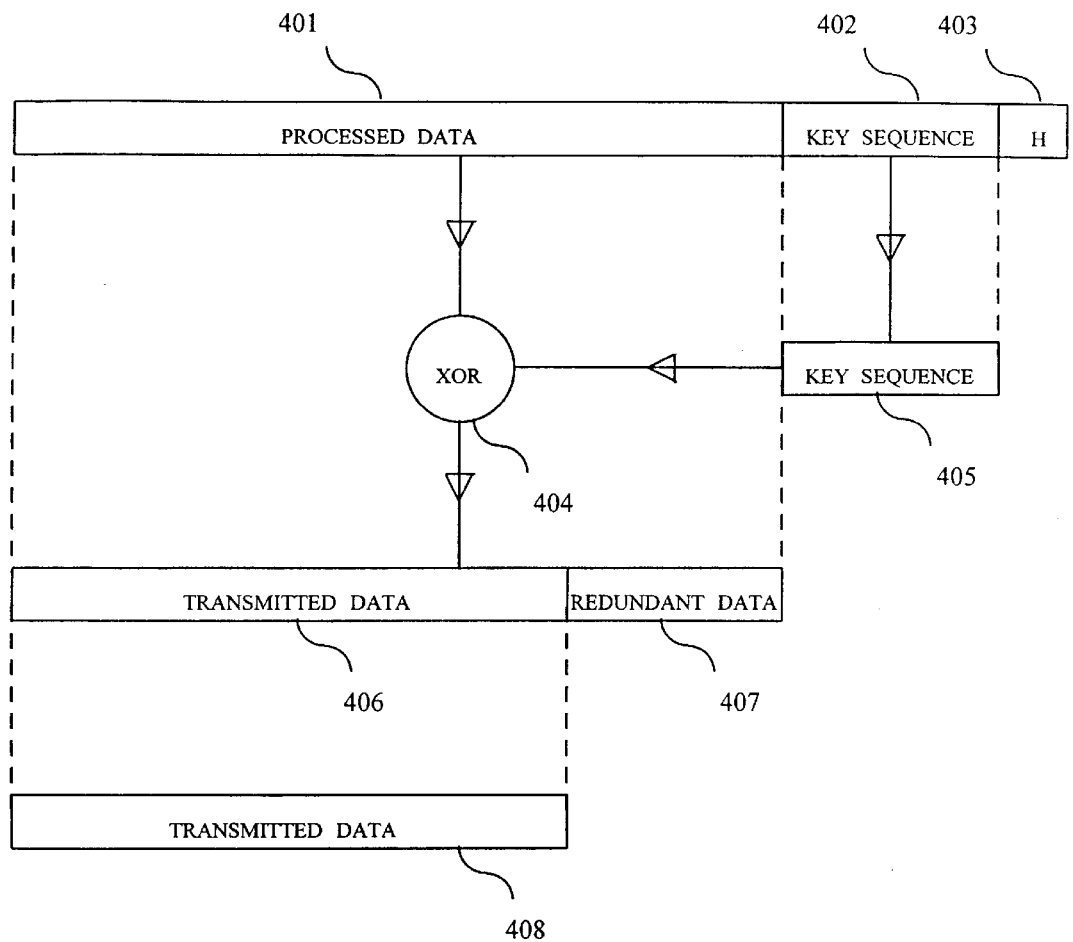
FIG. 4 depicts a succession of data sequences used in a receiving device as illustrated in FIG. 3.

In FIGS. 3 and 4 a receiver 301 can be seen, which receives the frame sent by the transmitter 106, possibly affected by error through the transmission.

The receiver 301 also detects sequences of data affected by errors which are not able to be processed by the receiving device and then causes the sending, to the sending device, of a message representing the need for a repetition of the sending of a sequence of data to be transmitted, according to techniques known in the transmission of data with acknowledgement.

The receiver 301 supplies the received data sequence, which includes:

a processed data sequence, possibly erroneous 401;
a key sequence, possibly erroneous 402; and
a header related to the protocol 403 (FIG. 4);
on the one hand to a key sequence extractor 302 and on the other and to a processing means 303.

The key sequence extraction means 302 is here a means of storing the sixteen binary data items which follow the header 403 and which form an extracted key sequence 405. This key sequence extraction means 302 consists for example of a counter which counts the binary data items which relate to the header 403 and a two-octet random access memory which stores the sixteen binary data items which follow the binary data items counted by the above-mentioned counter.

The key sequence extraction means 302 and the receiver 301 are synchronised, by means of a clock (optionally followed by a frequency divider), so that each of them supplies a binary data item at regular intervals of time to a processing means 303.

The processing means 303 performs an "exclusive OR" logic function between the binary data items which reach it simultaneously from the key sequence extraction means 302 and from the receiver 301 in order to form a coded data sequence including a transmitted data sequence 404 which may be erroneous and a redundant data sequence 407.

Thus, continuing the example given above and assuming that the last binary data item of the transmitted frame has been affected by an error during transmission, the processed data sequence 401 consists of:

00110011100000110100010111 0111 the extracted key sequence 405 is:

0010111010111001 then the transmitted sequence consists of the first 23 binary data items of the combination through the "exclusive OR" function, between the data items of the same ranking in the sequence of data items processed by means of a second series formed by an integer number (here 1) times the key sequence and a complementary number of the first data items of the key sequence, a number which enables the second series to have as many binary data items as the processed data sequence. Likewise the sequence of redundant data items is formed by binary data items of the same combination which follow those of the transmitted sequence.

The transmitted sequence is then:

00011101001110100110101 and the sequence of redundant data items is:

1011001.

A decoder 304 then corrects the errors affecting the transmitted data sequence 406, using, according to known techniques, the sequence of redundant data items 407, and supplies the transmitted data sequence 408 at an output 305.

The decoder 304 also effects the detection of the sequences of data 406 affected by errors which are not able to be corrected and then causes, by means of a transmission means, not shown but incorporated in the receiving device, the sending, to the transmission device, of a message representing the need for a repetition of sending of a sequence of data to be transmitted, according to techniques known in the transmission of data with acknowledgement.

It should be noted here that, as a preliminary to the outputting of the data transmitted by the output 305, these data items can be processed by means which are not shown. Likewise, means which are not shown can be interposed between the receiver 301 and the processing means 303 in order to effect complementary processings on the received data sequences.

The present invention is not limited to the embodiment described and depicted but, quite the contrary, extends to any modifications and improvements within the capability of persons skilled in the art.

Thus, according to a first preferential variant:

the encoding is performed, on the one hand, on the data which results from the combination of the data to be transmitted and the data of the key sequence and, on the other hand, on the key sequence, and correlatively;

the decoding is performed on the data leaving the receiver, before extraction of the key sequence and before combination with the data of this key sequence.

The advantage of this first variant is to make it possible to correct errors affecting the key sequence.

According to a second variant, the transmitted data are not binary, the combination function no longer being able to be an "exclusive OR" function but rather any arithmetic calculation such as for example a polynomial calculation or a matrix calculation.

According to a third variant, the key sequence generation means modifies the key cyclically, at regular intervals of time.

According to a fourth variant, the key sequence generation means modifies the key sequence cyclically, each time a predetermined number of sequences of data to be transmitted have been processed.

According to a fifth variant, the combination function which combines the sequence of data to be transmitted and the key sequence successively combines several data items in each of the sequences in order to form the processed sequence.

According to a sixth variant, not shown, the key sequence generator 104 has an additional input independent of the input of data to be transmitted 101 at which it receives additional data independent of the data to be transmitted, and generates a key sequence which takes into account the data received at this additional input.

This sixth variant notably has the advantage of being able to identify the author of the data to be transmitted (the additional data then representing this author), the machine having generated these data to be transmitted (the additional data then representing this machine), of being able to make secure a data encoding, or of supplying a key sequence dependent on a secret code.

According to a seventh variant, not shown, the frame transmitted by the transmission means does not contain directly the key sequence but some information representative of the key sequence. For example, the key sequence can be chosen from a predefined list containing $2^k$ (where k<n when n is the number of bits in each key sequence) elements known both to the transmission means and the reception means, and the information transmitted consists in the position number (represented by k bits) on said list of the chosen key sequence. This seventh variant has the advantage of reducing the number of supplementary bits to transmit in each frame.

What is claimed is:

1. A device for sending data sequences to be transmitted, comprising:

input means for inputting data sequences to be transmitted;

a means for repeating data sequences to be transmitted;

key sequence selecting means adapted to provide a key sequence for each data sequence to be transmitted coming from the input or from the repeating means independent of the data in the data sequence to be transmitted, the key sequences being different for data sequences to be transmitted which are separated by at least a predetermined number of other data sequences to be transmitted;

data combination means adapted to combine each data sequence to be transmitted with a key sequence corresponding thereto in order to provide a sequence of processed data; and sending means adapted to send frames successively representing each sequence of processed data so that two identical sequences of data to be transmitted, at least one of which comes from the repeating means and is separated by at least the predetermined number of other data sequences to be transmitted, are associated with two different key sequences and with two different processed sequences.

2. A device according to claim 1, wherein the sending means is adapted to send frames successively representing either each processed data sequence or the key sequence used to form the processed data sequence.

3. A device according to claim 1, wherein the key sequence selecting means is adapted to supply different key sequences for successive sequences of data to be transmitted, the predetermined number being nil.

4. A device according to claim 1, wherein the key sequence selecting means uses a pseudo-random determination of key sequences.

5. A device according to claim 1, wherein the combination means is adapted to combine the data to be transmitted and the data of the key sequences by successively combining each data item to be transmitted with a data item of the key sequence.

6. A device according to claim 5, wherein sequences of data to be transmitted and key sequences comprise binary data, and wherein the combination means uses an exclusive OR logic function which associates a value 0 with two identical binary values and a value 1 with two different binary values.

7. A device according to claim 1 further comprising means of receiving a message representing an error in transmitting a sequence of data to be transmitted and wherein the repeating means is adapted to repeat each sequence of data to be transmitted corresponding to a message representing a transmission error.

8. A device for receiving transmitted data, comprising:

receiving means adapted to supply sequences of processed data;

key sequence selecting means adapted to supply key sequences for each sequence of processed data, the key sequences being different for sequences of processed data separated by at least a predetermined number of other sequences of processed data;

means for processing data adapted to combine each sequence of processed data with a key sequence corresponding thereto in order to supply a sequence of transmitted data;

means of detecting erroneous sequences; and output means for outputting transmitted data sequences.

9. A device according to claim 8 further comprising a sending means adapted to send a message representing a transmission error to a sending device which has transmitted data corresponding to an erroneous sequence.

10. A device according to claim 9, wherein the receiving means is adapted to supply either processed data sequences or key sequences, the key sequence selecting means being adapted to select each key sequence in the data transmitted by the receiving means.

11. A device according to claim 8, wherein the key sequence selecting means is adapted to supply different key sequences for successive processed data sequences, the said predetermined number being nil.

12. A device according to claim 8, wherein the processing means is adapted to combine the processed data and the data of key sequences by successively combining each processed data item with a data item of a key sequence.

13. A device according to claim 12, wherein the processing means uses an exclusive OR logic function which associates a value 0 with two identical binary values and a value 1 with two different binary values.

14. A method of sending data sequences to be transmitted, comprising the steps of:

inputting a data sequence to be transmitted; and successively repeating transmission of a data sequence to be transmitted in a case where a previous transmission has been affected by an error, the transmission of a data sequence comprising the steps of:

selecting key sequences of data during which a key sequence is supplied for each data sequence to be transmitted coming from the input step or from the repeating step, the key sequences being different for data sequences to be transmitted separated by at least a predetermined number of other data sequences to be transmitted;

combining data wherein each data sequence to be transmitted is combined with a key sequence corresponding thereto and supplying a sequence of processed data; and successively sending frames representing each sequence of processed data so that two identical data sequences to be transmitted, where at least one comes from the repeating step and is separated by at least the predetermined number of other data sequences to be transmitted, are associated with two different key sequences and with two different processed data sequences.

15. A method according to claim 14, wherein, during the sending step, frames are sent that successively represent either each processed data sequence or the key sequence used for forming the processed data sequence.

16. A method according to claim 14, wherein, during the key sequence selecting step, different key sequences are supplied for successive sequences of data to be transmitted, the predetermined number being nil.

17. A method according to claim 14, wherein, during the selection step, a pseudo-random determination of key sequences is used.

18. A method according to claim 14, wherein, during the combining step, the data to be transmitted and the data of the key sequences are combined by successively combining each data item to be transmitted with a data item of a key sequence.

19. A method according to claim 18, wherein the sequences of data to be transmitted and the key sequences comprise binary data, and wherein, during the combining step, an exclusive OR logic function which associates a value of 0 with two identical binary values and a value of 1 with two different binary values is used.

20. A method according to claim 14, further comprising receiving a message representing an error in transmitting a sequence of data to be transmitted, wherein the repeating step is effected by each sequence of data to be transmitted corresponding to a message representing a transmission error.

21. A method of receiving transmitted data, comprising the steps of:

receiving supplied sequences of processed data;

selecting key sequences, wherein a key sequence is supplied for each processed data sequence, the key sequences being different for processed data sequences separated by at least a predetermined number of other processed data sequences;

processing each processed data sequence by combining each processed data sequence with a key sequence corresponding thereto and supplying a sequence of transmitted data;

detecting an erroneous sequence; and outputting transmitted data sequences.

22. A method according to claim 21, further comprising sending a message representing a transmission to a sending device which has transmitted data corresponding to an erroneous sequence.

23. A method according to claim 21, wherein during the receiving step either processed data sequences or key sequences are supplied, wherein each key sequence is selected from the transmitted data during the selection step.

24. A method according to claim 21, wherein, in the key sequence selecting step different key sequences are supplied for successive processed data sequences, the predetermined number being nil.

25. A method according to claim 21, wherein, during the processing step, the processed data and the key sequence data are combined by successively combining each processed data item with a key sequence data item.

26. A method according to claim 25, wherein, during the processing step, an exclusive OR logic function which associates a value of 0 with two identical binary values and a value of 1 with two different binary values is used.

* * * * *

UNITED STATES PATENT AND TRADEMARK OFFICE
CERTIFICATE OF CORRECTION

PATENT NO. : 6,130,895
DATED : October 10, 2000
INVENTOR(S) : Tannhauser

It is certified that error appears in the above-identified patent and that said Letters Patent is hereby corrected as shown below:

Column 1,
Line 62, "organised" should read -- organized --; and
Line 67, "desynchronised," should read -- desynchronized, --.

Column 2,
Line 4, "desynchronised," should read -- desynchronized --.

Column 3,
Line 3, "characterised" should read -- characterized --.

Column 4,
Lines 14, 32, 35, 40, and 44, "characterised" should read -- characterized --.

Column 5,
Line 66, "difference" should read -- different --.

Column 7,
Lines 7 and 10, "symbolised" should read -- symbolized --;
Line 15, "communication" should read -- communication --;
Line 24, "difference" should read -- different --; and
Line 52, "synchronised," should read -- synchronized, --.

UNITED STATES PATENT AND TRADEMARK OFFICE
CERTIFICATE OF CORRECTION

PATENT NO. : 6,130,895
DATED : October 10, 2000
INVENTOR(S) : Tannhauser

It is certified that error appears in the above-identified patent and that said Letters Patent is hereby corrected as shown below:

Column 11,
Line 33, "claim 14," should read -- claim 14 --.

Column 12,
Line 16, "claim 21," should read -- claim 21 --.

Signed and Sealed this

Second Day of October, 2001

Attest:

*Attesting Officer*

NICHOLAS P. GODICI
*Acting Director of the United States Patent and Trademark Office*